United States Patent
Jung et al.

(10) Patent No.: US 10,407,545 B2
(45) Date of Patent: Sep. 10, 2019

(54) POLYMERIZATION COMPOSITION, POLYMER USING POLYMERIZATION COMPOSITION, AND POLYMER ELECTROLYTE MEMBRANE USING POLYMER

(71) Applicant: LG CHEM, LTD., Seoul (KR)

(72) Inventors: Sehee Jung, Daejeon (KR); Joong Jin Han, Daejeon (KR); Hyun Woog Ryu, Daejeon (KR); Yong Jin Jang, Daejeon (KR); Youngjea Kim, Daejeon (KR); Esder Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 51 days.

(21) Appl. No.: 15/516,756

(22) PCT Filed: Oct. 28, 2015

(86) PCT No.: PCT/KR2015/011463
§ 371 (c)(1),
(2) Date: Apr. 4, 2017

(87) PCT Pub. No.: WO2016/068606
PCT Pub. Date: May 6, 2016

(65) Prior Publication Data
US 2017/0298179 A1    Oct. 19, 2017

(30) Foreign Application Priority Data

Oct. 28, 2014    (KR) .................. 10-2014-0147782
Oct. 28, 2014    (KR) .................. 10-2014-0147784

(51) Int. Cl.
*C08G 65/40*    (2006.01)
*C08G 73/06*    (2006.01)
(Continued)

(52) U.S. Cl.
CPC ............. *C08G 65/40* (2013.01); *C08G 73/06* (2013.01); *C08J 5/22* (2013.01); *C08L 71/12* (2013.01);
(Continued)

(58) Field of Classification Search
CPC ..... C08G 65/40; C08G 73/06; H01M 8/1027; H01M 8/188; H01M 8/1032; H01M 8/103;
(Continued)

(56) References Cited

U.S. PATENT DOCUMENTS 3,498,960 A    3/1970    Wofford et al.
2008/0286627 A1    11/2008    Kubota et al.
(Continued)

FOREIGN PATENT DOCUMENTS

JP    2001-357877 A    12/2001
JP    4656060 B2    3/2011
(Continued)

OTHER PUBLICATIONS

R. Andreu et al., Studies on the Thermal Polymerization of Substitued Benzoxazine Monomers: Electronic Effects, 2008, Journal of Plymer Science: Part A: Polymer Chemistry, vol. 46, 3353-3366.*
(Continued)

*Primary Examiner* — Maria Laios
*Assistant Examiner* — Kwang Han
(74) *Attorney, Agent, or Firm* — Birch, Stewart, Kolasch & Birch, LLP

(57) ABSTRACT

The present specification relates to a polymerization composition, a polymer using the same, a polymer electrolyte membrane using the same, a fuel cell including the same, and a redox flow battery including the same.

3 Claims, 2 Drawing Sheets

(51) Int. Cl.
*C08J 5/22* (2006.01)
*H01M 8/18* (2006.01)
*C08L 71/12* (2006.01)
*H01M 8/103* (2016.01)
*H01M 8/1027* (2016.01)
*H01M 8/1032* (2016.01)
*H01M 8/1018* (2016.01)

(52) U.S. Cl.
CPC ......... *H01M 8/103* (2013.01); *H01M 8/1027* (2013.01); *H01M 8/1032* (2013.01); *H01M 8/188* (2013.01); *H01M 2008/1095* (2013.01); *H01M 2300/0082* (2013.01); *Y02E 60/528* (2013.01)

(58) Field of Classification Search
CPC ... H01M 2008/1095; H01M 2300/0082; C08J 5/22; C08L 71/12; Y02E 60/528
See application file for complete search history.

(56) References Cited

U.S. PATENT DOCUMENTS

| | | | |
|---|---|---|---|
| 2011/0166241 A1 | 7/2011 | Choi et al. | |
| 2011/0240550 A1* | 10/2011 | Moore | B01D 67/0011 210/490 |
| 2013/0115504 A1 | 5/2013 | Lee et al. | |
| 2013/0273450 A1* | 10/2013 | Choi | H01M 8/1027 429/454 |
| 2014/0315119 A1 | 10/2014 | Choi et al. | |

FOREIGN PATENT DOCUMENTS

| | | | | |
|---|---|---|---|---|
| JP | 2011-184552 | * | 9/2011 | ............. C08G 59/62 |
| JP | 2011-184552 A | | 9/2011 | |
| KR | 2003-0076057 A | | 9/2003 | |
| KR | 10-2010-0050423 A | | 5/2010 | |
| KR | 10-1417748 B1 | | 7/2014 | |

OTHER PUBLICATIONS

Machine translation of JP 2011-184552, Thermosetting Resin Solution, Masanori Nakamura, 2011 (Year: 2011).*
European Search Report for Appl. No. 15854568.1 dated Feb. 20, 2018.
Chaturvedi et al., "Task specific ionic liquids: Reaction selectivity in organic synthesis", Signpost Open Access Journal of Organic & Biomolecular Chemistry, vol. 2, 2014, pp. 51-79.
International Search Report (PCT/ISA/210) issued in PCT/KR2015/011463, dated Dec. 28, 2015.

* cited by examiner

[Figure 1]
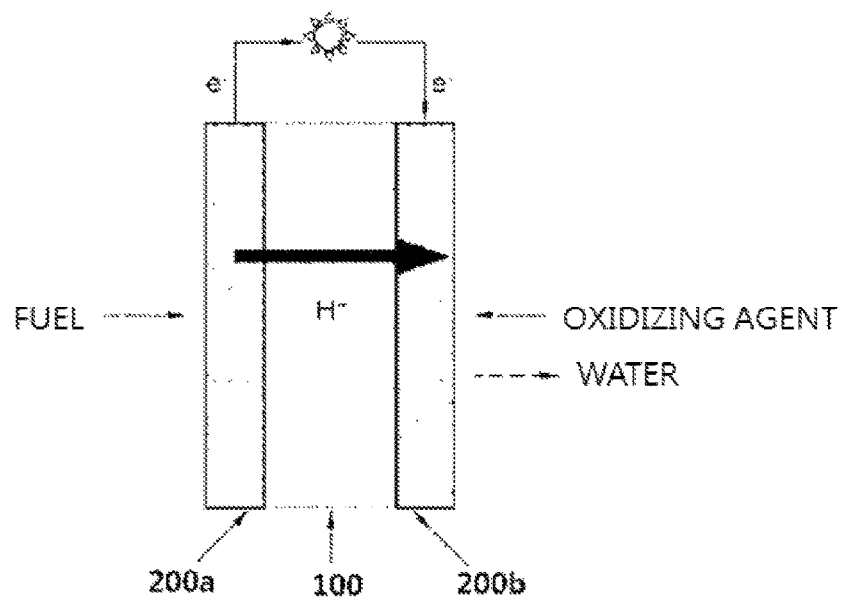
[Figure 2]
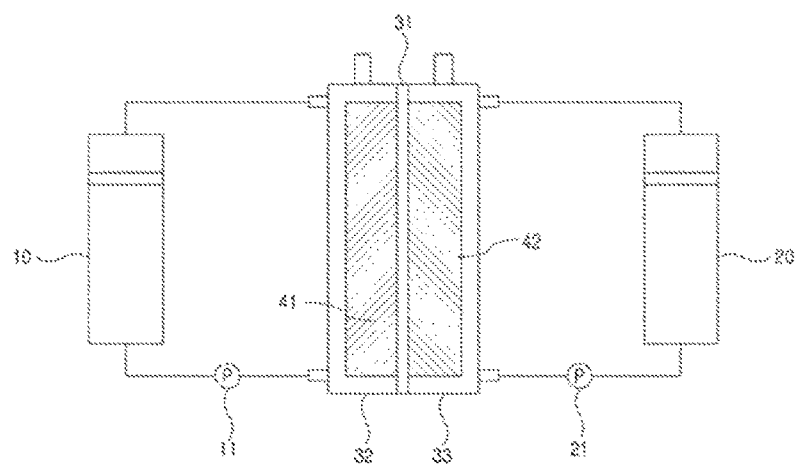

[Figure 3]
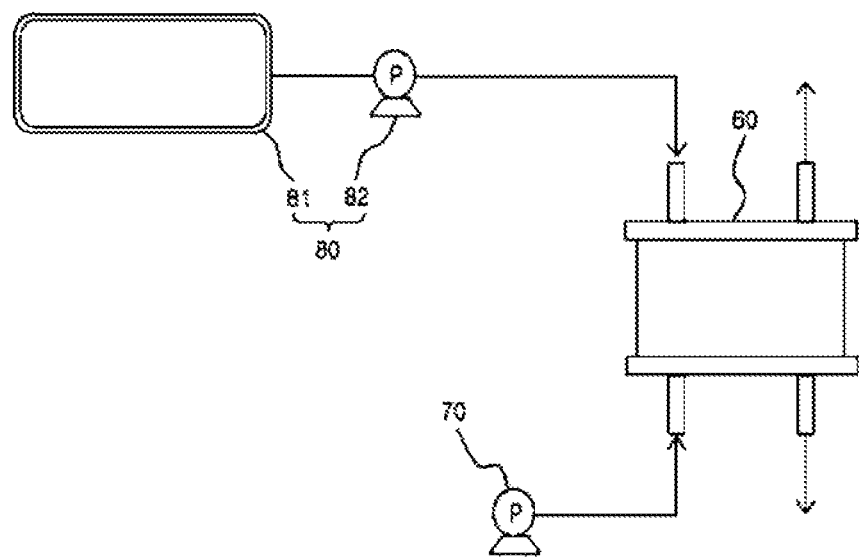

POLYMERIZATION COMPOSITION, POLYMER USING POLYMERIZATION COMPOSITION, AND POLYMER ELECTROLYTE MEMBRANE USING POLYMER

TECHNICAL FIELD

This application claims priority to and the benefit of Korean Patent Application Nos. 10-2014-0147782 and 10-2014-0147784 filed in the Korean Intellectual Property Office on Oct. 28, 2014, the entire contents of which are incorporated herein by reference.

The present specification relates to a polymerization composition, a polymer using the same, a polymer electrolyte membrane using the same, a fuel cell including the same, and a redox flow battery including the same.

BACKGROUND ART

A polymer refers to a compound having a large molecular weight, and to a compound formed by polymerizing several low molecular weight molecules called monomers. Polymers may be divided into linear polymers, branch polymers, cross-linked polymers, and the like according to a structure and a shape of a chain, and exhibit a significant difference in physical and chemical characteristics according to the structure.

Polymers have excellent mechanical strength and good processability in spite of the relatively light weight thereof, and have been usually used as a material constituting a structure, but the use thereof as a functional material has been recently highlighted due to excellent physical and chemical characteristics thereof.

Representative examples thereof include utilization for a polymer separation membrane. A polymer separation membrane means not a simple thin membrane such as a film, but a polymer membrane having a function of separating materials. Specifically, the polymer separation membrane has been used as an electrolyte membrane capable of exchanging positive ions, such as a fuel cell and a redox flow battery.

A fuel cell is an energy conversion device that converts the chemical energy of a fuel directly into electrical energy. That is, the fuel cell uses a fuel gas and an oxidizing agent, and adopts a method of producing electric power by using the electrons generated during the redox reaction of the fuel gas and the oxidizing agent. A membrane electrode assembly (MEA) of the fuel cell is a part in which an electrochemical reaction of hydrogen and oxygen occurs, and is composed of a cathode, an anode, and an electrolyte membrane, that is, an ion conductive electrolyte membrane.

A redox flow battery (oxidation-reduction flow battery) is an electrochemical storage device that stores chemical energy of an active material directly into electrical energy by using a system in which the active material included in an electrolytic solution is oxidized and reduced and thus charged and discharged. A unit cell of the redox flow battery includes an electrode, an electrolyte, and an ion exchange membrane (electrolyte membrane).

Fuel cells and redox flow batteries have been researched and developed as a next-generation energy source due to high energy efficiency and eco-friendly characteristics of less emission of contaminants.

One of the essential constituent elements of the fuel cells and the redox flow batteries is a polymer electrolyte membrane capable of exchanging positive ions, and in order to prepare a polymer membrane for a fuel cell and/or a redox flow battery having high durability and acid resistance, studies have been conducted on a monomer used during the synthesis of a polymer, a polymerization composition including the same, and the like.

[Patent Document] Official Gazette of Korean Patent Application Laid-Open No. 2003-0076057

DETAILED DESCRIPTION OF THE INVENTION

Technical Problem

The present specification has been made in an effort to provide a polymerization composition, a polymer using the same, a polymer electrolyte membrane using the same, a fuel cell including the same, and a redox flow battery including the same.

Technical Solution

An exemplary embodiment of the present specification provides a polymerization composition including a compound for a brancher, which is represented by the following Chemical Formula 1.

[Chemical Formula 1]

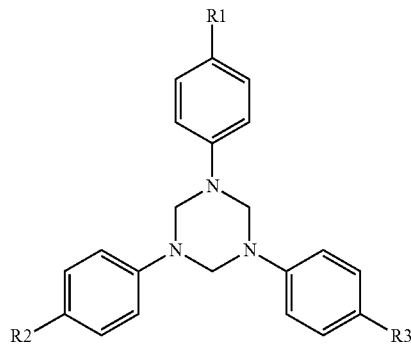

In Chemical Formula 1,
R1 to R3 are the same as or different from each other, and are each a halogen group or a hydroxy group.

Further, another exemplary embodiment of the present specification provides a polymer including a monomer derived from the compound for the brancher, which is represented by Chemical Formula 1, as a brancher.

Still another exemplary embodiment of the present specification provides a membrane electrode assembly including: a positive electrode; a negative electrode; and an electrolyte membrane provided between the positive electrode and the negative electrode, in which the electrolyte membrane is the polymer electrolyte membrane.

In addition, yet another exemplary embodiment of the present specification provides a polymer electrolyte-type fuel cell including: a stack which includes the two or more membrane electrode assemblies and a bipolar plate provided between the membrane electrode assemblies; a fuel supplying part which supplies fuel to the stack; and an oxidizing agent supplying part which supplies an oxidizing agent to the stack.

Still yet another exemplary embodiment of the present specification provides a redox flow battery including: a positive electrode cell including a positive electrode and a positive electrode electrolytic solution; a negative electrode cell including a negative electrode and a negative electrode electrolytic solution; and the polymer electrolyte membrane provided between the positive electrode cell and the negative electrode cell.

Advantageous Effects

A polymer synthesized by using a polymerization composition according to an exemplary embodiment of the present specification has excellent durability and acid resistance.

Further, a polymer according to an exemplary embodiment of the present specification has excellent durability and acid resistance. Accordingly, there is an effect in that a polymer electrolyte membrane including the same has excellent physical and chemical stabilities.

The polymer electrolyte membrane according to an exemplary embodiment of the present specification has excellent proton conductivity. The polymer electrolyte membrane according to an exemplary embodiment has excellent mechanical strength.

A fuel cell and/or a redox flow battery including the polymer electrolyte membrane according to an exemplary embodiment of the present specification has excellent performance.

BRIEF DESCRIPTION OF DRAWINGS

FIG. 1 is a schematic view illustrating the electricity generation principle of a fuel cell.

FIG. 2 is a view schematically illustrating an exemplary embodiment of a redox flow battery.

FIG. 3 is a view schematically illustrating an exemplary embodiment of a fuel cell.

BEST MODE

Hereinafter, the present specification will be described in more detail.

In the present specification, the "monomer" means a structure in which a compound is included in the form of a divalent or more group in a polymer by a polymerization reaction.

In the present specification, the "brancher" means a compound having three or more reactive substituents, and a compound which forms a structure of a branched polymer, that is, a polymer including a main chain, a branch point, and a side chain linked to the main chain at the branch point, when the brancher is included as a monomer of a polymer.

According to an exemplary embodiment of the present specification, the halogen group is fluorine or chlorine.

According to an exemplary embodiment of the present specification, the halogen group is fluorine.

According to an exemplary embodiment of the present specification, R1 to R3 are the same as each other.

According to an exemplary embodiment of the present specification, R1 to R3 are a halogen group.

According to another exemplary embodiment, R1 to R3 are fluorine.

According to an exemplary embodiment of the present specification, the compound for the brancher, which is represented by Chemical Formula 1, may be any one selected among the following structures.

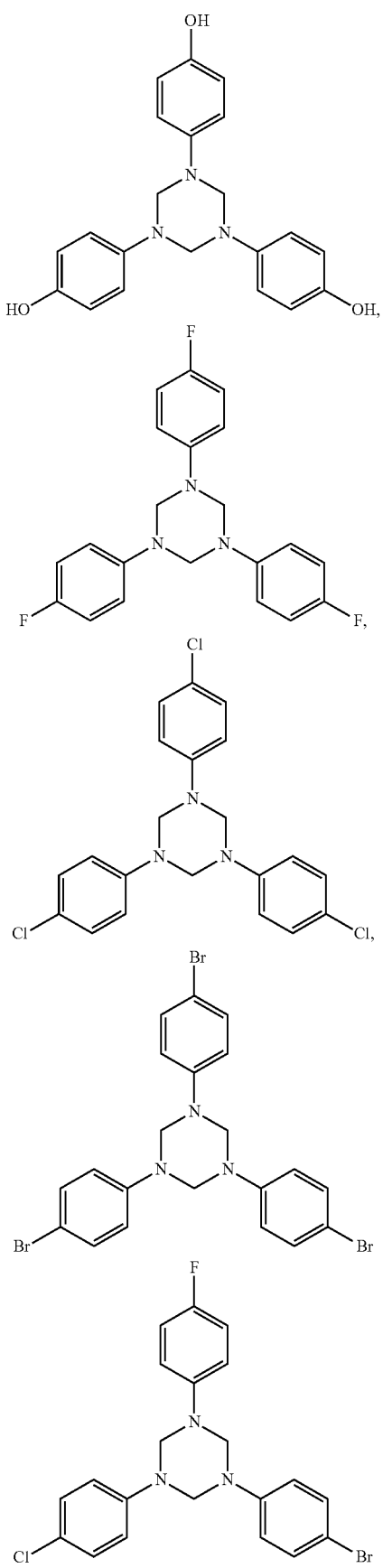 [SMILES: Oc1ccc(N2CN(c3ccc(O)cc3)CN(c3ccc(O)cc3)C2)cc1 ; Fc1ccc(N2CN(c3ccc(F)cc3)CN(c3ccc(F)cc3)C2)cc1 ; Clc1ccc(N2CN(c3ccc(Cl)cc3)CN(c3ccc(Cl)cc3)C2)cc1 ; Brc1ccc(N2CN(c3ccc(Br)cc3)CN(c3ccc(Br)cc3)C2)cc1 ; Fc1ccc(N2CN(c3ccc(Cl)cc3)CN(c3ccc(Br)cc3)C2)cc1]

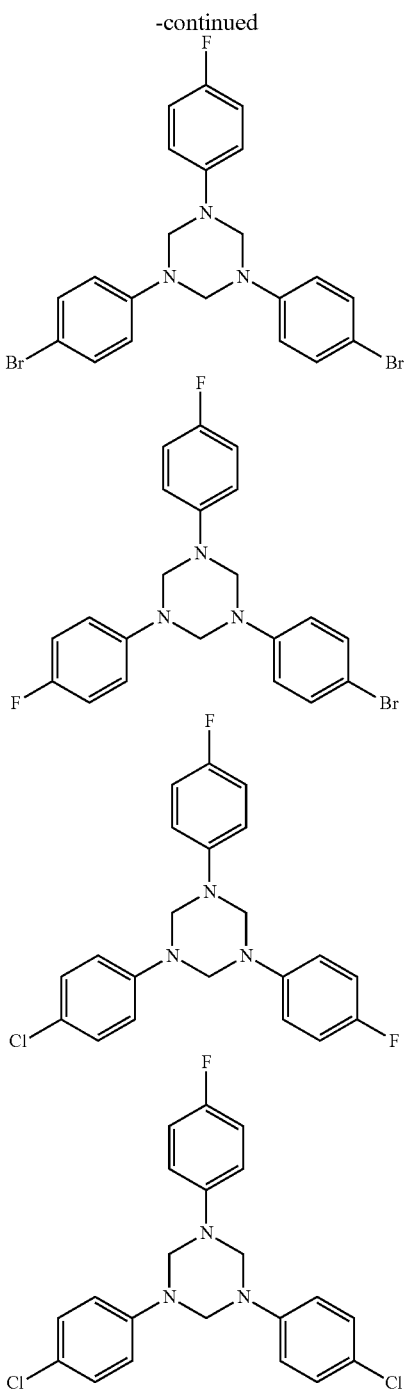

According to an exemplary embodiment of the present specification, the compound for the brancher, which is represented by Chemical Formula 1, is included as a brancher during the synthesis of a polymer.

According to an exemplary embodiment of the present specification, a polymerization composition may further include a co-monomer, a solvent, and/or a catalyst in addition to the compound for the brancher, which is represented by Chemical Formula 1.

As an example of the co-monomer, it is possible to use a monomer constituting a perfluorosulfonic acid polymer, a hydrocarbon-based polymer, polyimide, polyvinylidene fluoride, polyethersulfone, polyphenylene sulfide, polyphenylene oxide, polyphosphazene, polyethylene naphthalate, polyester, doped polybenzimidazole, polyether ketone, polysulfone, acids thereof or bases thereof.

According to an exemplary embodiment of the present specification, the content of the additional co-monomer in the polymerization composition may be more than 0 wt % and 95 wt % or less.

The solvent is not particularly limited, as long as the solvent can dissolve a polymer well, and a solvent having a different boiling point may be selected depending on the polymerization temperature. Specifically, as an example of the solvent, dimethylsulfoxide (DMSO), dimethyl acetamide, N-methyl-2-pyrrolidone, and the like may be used, but the example is not limited thereto.

According to an exemplary embodiment of the present specification, the content of the solvent in the polymerization composition may be more than 0 wt % and 50 wt % or less.

As an example of the catalyst, potassium carbonate, sodium carbonate, potassium hydroxide, sodium hydroxide, and the like may be used, but the example is not limited thereto.

In an exemplary embodiment of the present invention, a monomer derived from the compound for the brancher, which is represented by Chemical Formula 1, may have the following structure.

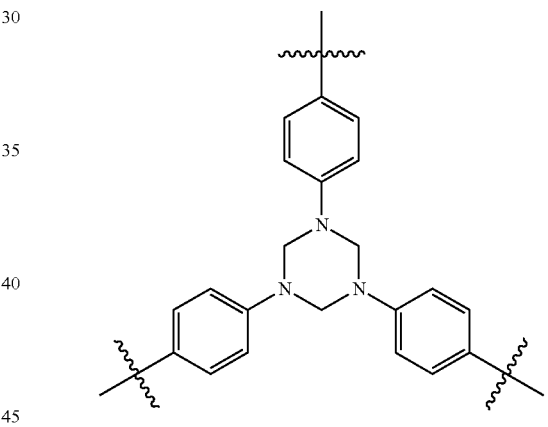

According to an exemplary embodiment of the present specification, the monomer is a monomer for a brancher. The brancher serves to link or cross-link polymer chains. Branches may be formed to chains, or chains may be cross-linked to each other to form a network-type structure according to the number of repeating units of the monomer derived from the compound for the brancher, which is used as a brancher and represented by Chemical Formula 1.

Separation membranes for a fuel cell and/or a redox flow battery used in the related art have a problem in that the separation membrane is attacked by radicals during the polymerization, or bonds are broken by a sulfuric acid electrolyte during a test of the separation membrane. As one example, a representative brancher used in the related art has a problem in that in a ketone group positioned at the main chain of the brancher, the bonds are broken by radicals which may be generated during the polymerization reaction. That is, the brancher has a problem in that the thermal and chemical stability deteriorates.

A polymer according to an exemplary embodiment of the present specification and a polymer electrolyte membrane including the same have excellent physical and chemical stabilities. A specific explanation is as follows.

The compound for the brancher, which is represented by Chemical Formula 1 and included in the polymerization composition of the present specification, includes a tertiary amine. There is an advantage in that a breakage phenomenon caused by the attack of radicals during the synthesis of a polymer may be minimized by introducing a tertiary amine. That is, a polymer including the composition has excellent durability.

Further, the compound for the brancher, which is represented by Chemical Formula 1 and included in the polymerization composition of the present specification, has a 3-dimensional structure, and thus has an advantage in that the polymerization space is wide as compared to a flat structure during a polymerization reaction. As a result, a polymer synthesized by using the polymerization composition has a high molecular weight.

According to an exemplary embodiment of the present specification, the monomer derived from the compound for the brancher, which is represented by Chemical Formula 1 and included in the polymer, is a monomer for a brancher. When the monomer is used particularly as a brancher, the above-described effects may be exhibited.

As described above, the brancher serves to link or cross-link polymer chains. Branches may be formed to chains, or chains may be cross-linked to each other to form a network-type structure according to the number of repeating units of a monomer derived from the compound for the brancher, which is represented by Chemical Formula 1 and used as a brancher.

Further, when the monomer derived from the compound for the brancher, which is represented by Chemical Formula 1, is used as a brancher, the length, the distribution, the position, and the number of branchers in the polymer skeleton, and the like may be controlled, and in this case, there is an advantage in that a thin film may be effectively prepared because physical and chemical properties of the polymer electrolyte membrane do not deteriorate.

When a polymer is synthesized by using the polymerization composition according to an exemplary embodiment of the present specification, the above-described effect may be exhibited.

A polymer membrane including a polymer prepared by using the polymerization composition according to an exemplary embodiment of the present specification may exhibit the above-described effect. The polymer membrane may mean a membrane capable of exchanging ions, and may be utilized in a fuel cell, a redox flow battery, and the like.

The content of the monomer derived from the compound for the brancher, which is represented by Chemical Formula 1, in the polymer prepared by using the polymerization composition may be 0.001 wt % or more and 10 wt % or less, and preferably more than 0.001 wt % and 10 wt % or less, based on the total weight of the polymer. When the content of the monomer derived from the compound for the brancher, which is represented by Chemical Formula 1, satisfies the numerical range, a function as a polymer electrolyte membrane may be efficiently exhibited.

More specifically, when the compound for the brancher, which is represented by Chemical Formula 1, is used as a brancher, the cross-linking degree of the polymer is sufficiently increased, and as a result, an effect of a change in physical properties of a final polymer may be obtained as described above, and when the compound is prepared into a polymer electrolyte membrane, there is an advantage in that a breakage phenomenon caused by the attack of radicals may be prevented by a chemically stable tertiary amine. In addition, when the compound for the brancher, which is represented by Chemical Formula 1, is included in an amount of 10 wt % or less based on the total weight of the polymer, the remaining branchers which fail to participate in the reaction are less likely to be generated in the polymer, and as a result, at the time of polymerizing hydrophobic portions, the end group may be designed with a hydroxy group (—OH), so that there is an advantage in that a finally desired block-type copolymer may be polymerized.

The compound for the brancher, which is represented by Chemical Formula 1, may be prepared based on Preparation Examples to be described below. According to an exemplary embodiment, the compound may be prepared by the method such as the following Reaction Formula 1.

[Reaction Formula 1]

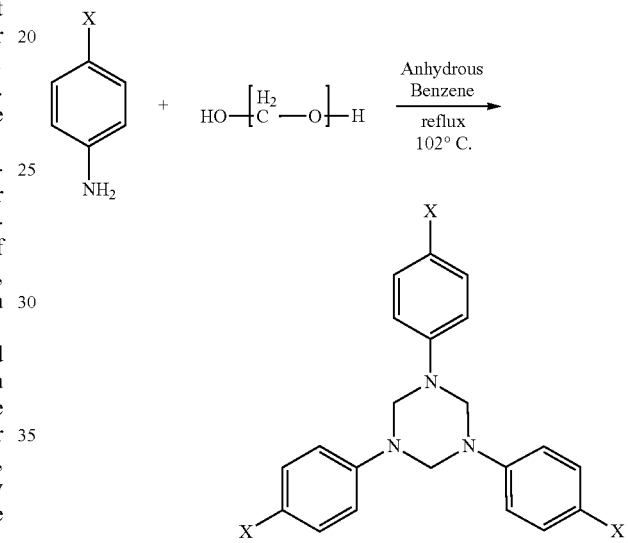

In Reaction Formula 1, X is a halogen group or a hydroxy group.

According to an exemplary embodiment of the present specification, the polymer may also include an additional co-monomer. As the additional co-monomer, those known in the art may be used. In this case, one or two or more co-monomers may be used.

As an example of the co-monomer, it is possible to use a monomer constituting a perfluorosulfonic acid polymer, a hydrocarbon-based polymer, polyimide, polyvinylidene fluoride, polyethersulfone, polyphenylene sulfide, polyphenylene oxide, polyphosphazene, polyethylene naphthalate, polyester, doped polybenzimidazole, polyether ketone, polysulfone, acids thereof or bases thereof.

According to an exemplary embodiment of the present specification, the content of the additional co-monomer in the polymer may be more than 0 wt % and 95 wt % or less.

According to another exemplary embodiment, the monomer derived from the compound for the brancher, which is represented by Chemical Formula 1, in the polymer may be included in an amount of 0.001 wt % or more and 10 wt % or less based on the total weight of the polymer. When the monomer derived from the compound for the brancher, which is represented by Chemical Formula 1, is included in an amount of 0.001 wt % or more as a brancher, the brancher may sufficiently increase the cross-linking degree of the polymer to obtain an effect of a change in physical properties of a final polymer, and when the monomer is included in an amount of 10 wt % or less, the remaining branchers which fail to participate in the reaction are less likely to be generated in the polymer, and as a result, at the time of polymerizing hydrophobic portions, the end group may be designed with a hydroxy group (—OH), so that there is an advantage in that a finally desired block-type copolymer may be polymerized.

It is preferred that the polymer including the monomer derived from the compound for the brancher, which is represented by Chemical Formula 1, is a block-type copolymer. The polymer may be, for example, synthesized by a condensation polymerization method in which a halogen group or a hydroxy group of a monomer is reacted and bonded while being released as HF, HCl or $H_2O$, and the like.

According to an exemplary embodiment of the present specification, the polymer is a block-type copolymer including a hydrophilic block and a hydrophobic block.

According to an exemplary embodiment of the present specification, the monomer derived from the compound for the brancher, which is represented by Chemical Formula 1, may be positioned between the hydrophilic blocks, between the hydrophobic blocks or between the hydrophilic block and the hydrophobic block.

The "hydrophilic block" of the present specification means a block having an ion exchange group as a functional group. Here, the functional group may be any one selected from the group consisting of —$SO_3H$, —$SO_3^-M^+$, —COOH, —$COO^-M^+$, —$PO_3H_2$, —$PO_3H^-M+$, and —$PO_3^{2-}2M^+$. Here, M may be a metallic element. That is, the functional group may be hydrophilic.

The "block having an ion exchange group" of the present specification means a block having 0.5 or more on average of ion exchange groups based on the number of ion exchange groups per one constituting unit constituting the corresponding block, and is more preferably a block having 1.0 or more on average of ion exchange groups per one constituting unit.

"A hydrophobic block" of the present specification means a polymer block having substantially no ion exchange group.

The "block substantially having no ion exchange group" of the present specification means a block having less than 0.1 on average of ion exchange groups based on the number of ion exchange groups per one constituting unit constituting the corresponding block, and is more preferably a block having 0.05 or less on average of ion exchange groups, and even more preferably a block having no ion exchange group.

Meanwhile, in the present specification, "a block-type copolymer" is a concept including copolymers not only in a co-polymerization system in which a hydrophilic block and a hydrophobic block form a main chain structure, but also in a co-polymerization system of a graft polymerization in which a block at one side forms a main chain structure, and a block at the other side forms a side-chain structure. Meanwhile, a polymer used in the present specification is not limited to the above-described block-type copolymer, and a polymer including a fluorine-based element may also be used. In this case, the polymer including a fluorine-based element may also include a functional group, and the functional group may be hydrophilic. For example, the functional group may be any one selected from the group consisting of —$SO_3H$, —$SO_3^-M^+$, —COOH, —$COO^-M^+$, —$PO_3H_2$, —$PO_3H^-M^+$, and —$PO_3^{2-}2M^+$. Here, M may be a metallic element.

According to an exemplary embodiment of the present specification, the block-type copolymer is a copolymer including a repeating unit of the following Chemical Formula A, a repeating unit of the following Chemical Formula B, and a monomer according to an exemplary embodiment of the present specification as a brancher.

[Chemical Formula A]

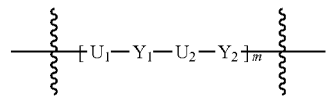

[Chemical Formula B]

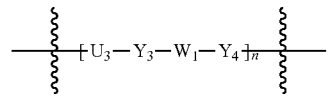

In Chemical Formulae A and B, $Y_1$ to $Y_4$ are the same as or different from each other, and are each independently —O—, —S—, or —$SO_2$—, $U_1$ and $U_2$ are the same as or different from each other, and are each independently represented by any one of the following Chemical Formulae 2 to 4,

[Chemical Formula 2]

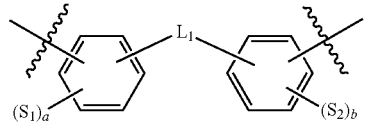

[Chemical Formula 3]

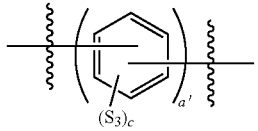

[Chemical Formula 4]

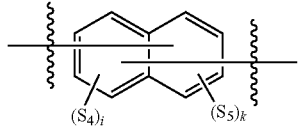

In Chemical Formulae 2 to 4, $L_1$ is any one of a direct link, —$C(Z_1)(Z_2)$—, —CO—, —O—, —S—, —$SO_2$—, —$Si(Z_1)(Z_2)$—, and a substituted or unsubstituted fluorenyl group, $Z_1$ and $Z_2$ are the same as or different from each other, and are each independently any one of hydrogen, an alkyl group, a trifluoromethyl group (—$CF_3$), and a phenyl group, $S_1$ to $S_5$ are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; or a substituted or unsubstituted heteroaryl group, a, b, and c are the same as or different from each other, and are each independently an integer of 0 or more and 4 or less, i and k are the same as or different from each other, and are each independently an integer of 0 or more and 3 or less, a' is an integer of 1 or more and 1,000 or less, in Chemical Formula B, $W_1$ is represented by any one of the following Chemical Formulae 5 to 7,

[Chemical Formula 5]

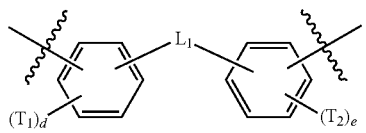

[Chemical Formula 6]

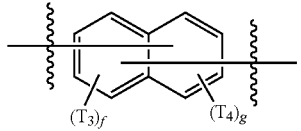

[Chemical Formula 7]

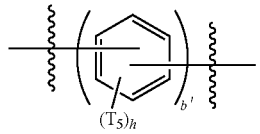

in Chemical Formulae 5 to 7, $L_2$ is a direct link, or any one selected from —$CZ_3Z_4$—, —CO—, —O—, —S—, —$SO_2$—, —$SiZ_3Z_4$—, and a substituted or unsubstituted fluorenyl group, $Z_3$ and $Z_4$ are the same as or different from each other, and are each independently any one of hydrogen, an alkyl group, a trifluoromethyl group (—$CF_3$), and a phenyl group, d, e, and h are the same as or different from each other, and are each independently an integer of 0 or more and 4 or less, f and g are the same as or different from each other, and are each independently an integer of 0 or more and 3 or less, b' is an integer of 1 or more and 1000 or less, $T_1$ to $T_5$ are the same as or different from each other, and each independently, at least one is —$SO_3H$, —$SO_3^-M^+$, —COOH, —$COO^-M^+$, —$PO_3H_2$, —$PO_3H^-M^+$, or —$PO_3^{2-}2M^+$, and M is an element of Group 1, and the others are the same as or different from each other, and are each independently hydrogen; deuterium; a halogen group; a cyano group; a nitrile group; a nitro group; a hydroxy group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted boron group; a substituted or unsubstituted amine group; a substituted or unsubstituted alkylamine group; a substituted or unsubstituted aralkylamine group; a substituted or unsubstituted arylamine group; a substituted or unsubstituted heteroarylamine group; a substituted or unsubstituted aryl group; or a substituted or unsubstituted heteroaryl group, in Chemical Formula B, $U_3$ is represented by any one of Chemical Formulae 2 to 7, m and n mean the number of repeating units, $1 \leq m \leq 500$, and $1 \leq n \leq 500$, and the number of repeating units of the monomer according to an exemplary embodiment of the present specification, which is included as a brancher, is 1 or more and 300 or less.

According to an exemplary embodiment of the present specification, the number of repeating units of the monomer according to an exemplary embodiment of the present specification, which is included as a brancher, may be 10 or more and 300 or less. When the number of repeating units is 10 or more, an ion transport resin is physically stable, ion transport channels are formed well, and accordingly, there is an advantage in that the conductivity is ultimately increased. When the number of repeating units is less than 10, the cross-linking degree of hydrophilic portions and hydrophobic portions in the polymer becomes low, the molecular weight of a final polymer is decreased, the impact strength is decreased, the ion transport channels are not formed well, and accordingly, physical properties of the ion transport resin are likely to deteriorate.

According to an exemplary embodiment of the present specification, the monomer derived from the compound for the brancher, which is represented by Chemical Formula 1, is included in an amount of 0.001 wt % or more and 10 wt % or less based on the total weight of the polymer. When the monomer derived from the compound for the brancher, which is represented by Chemical Formula 1, is included in an amount of 0.001 wt % or more based on the total weight of the polymer, the cross-linking degree of the polymer may be sufficiently increased to bring an effect of a change in physical properties of a final polymer, and when the monomer is included in an amount of 10 wt % or less, the generation rate of the remaining monomers which fail to participate in the reaction is low, and at the time of polymerizing hydrophobic portions, the end group may be designed with a hydroxy group, so that there is an advantage in that a finally desired block-type copolymer may be synthesized.

According to an exemplary embodiment of the present specification, $U_1$, $U_2$, and $U_3$ are the same as or different from each other, and are each independently any one selected from the following structural formulae.

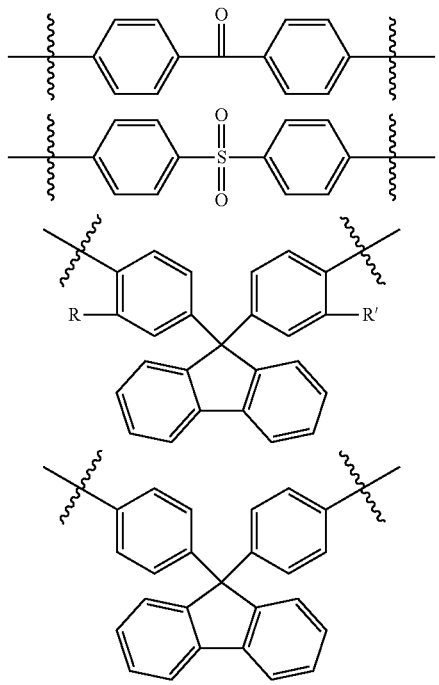

-continued
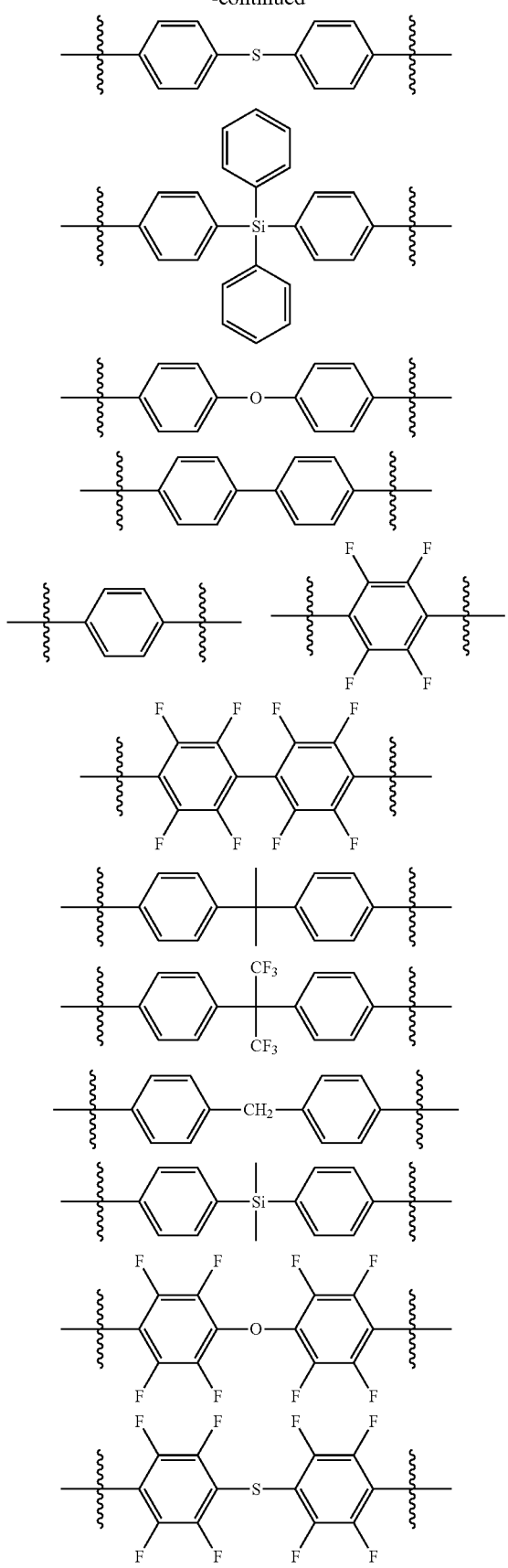
In the structural formulae, R and R' are each independently —NO$_2$ or —CF$_3$.
According to another exemplary embodiment, W$_1$ is any one selected from the following structural formulae.
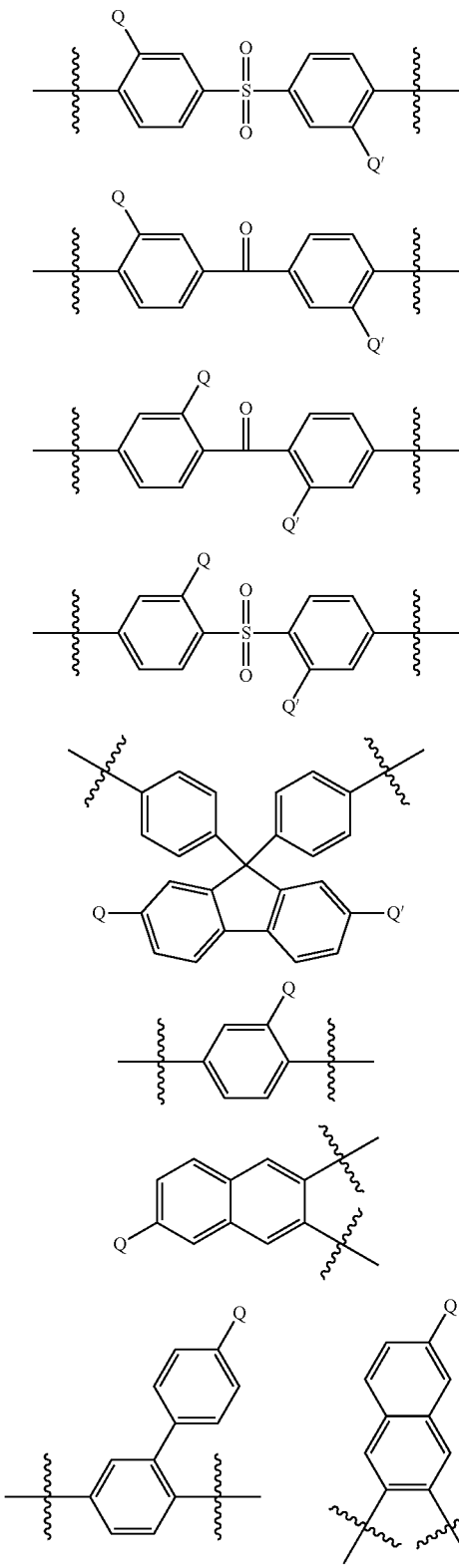

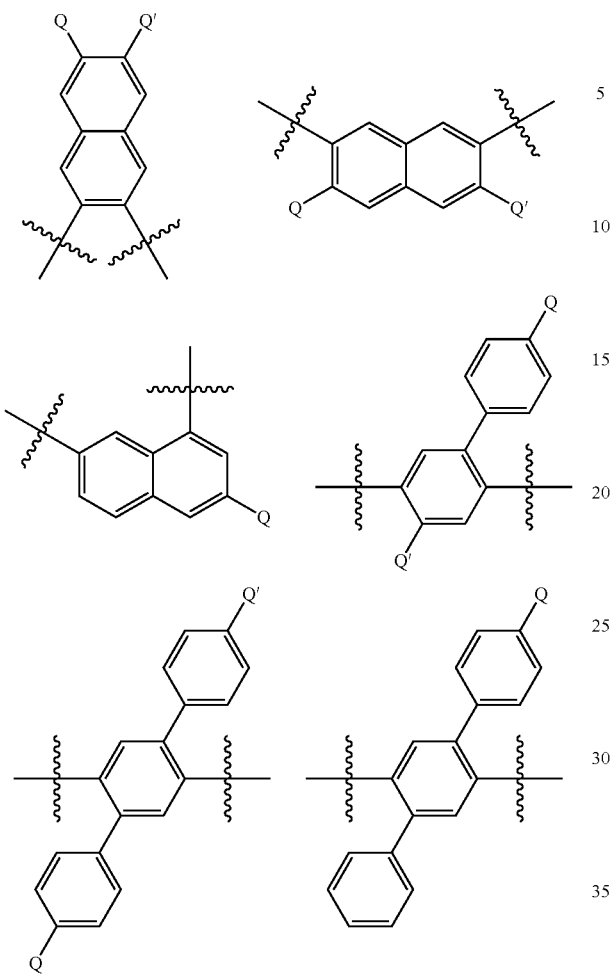
In the structural formulae, Q and Q' are each independently —SO₃H, —SO₃⁻M⁺, —COOH, —COO⁻M⁺, —PO₃H₂, —PO₃H⁻ M⁺, or —PO₃²⁻2M⁺, and M is a metal of Group 1.
According to an exemplary embodiment of the present specification, W₁ is any one selected from the following structural formulae.
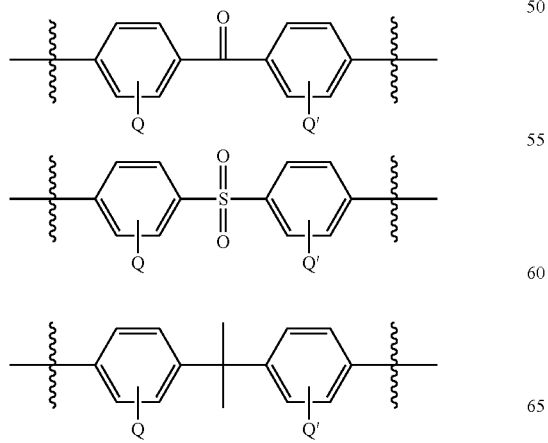
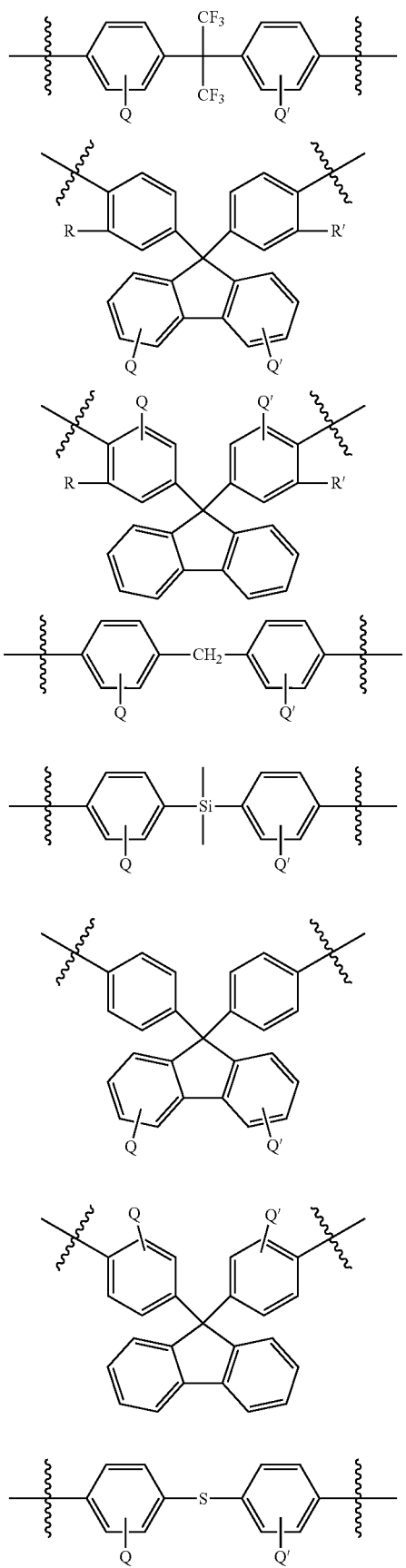

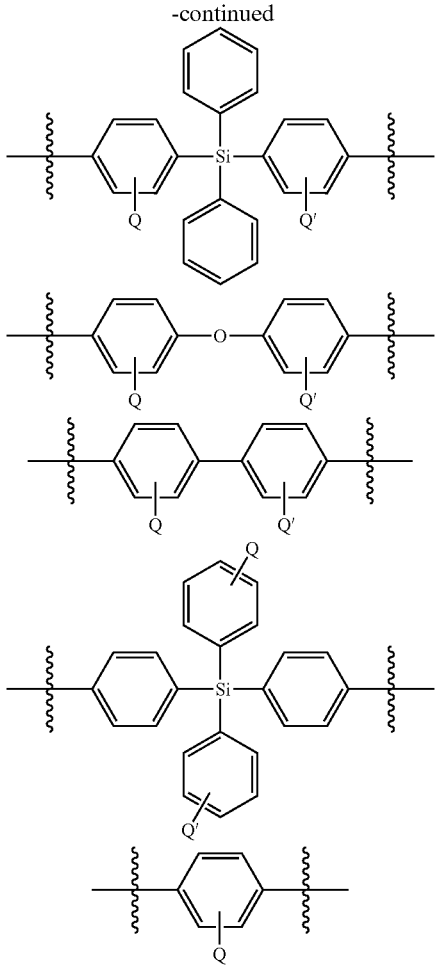

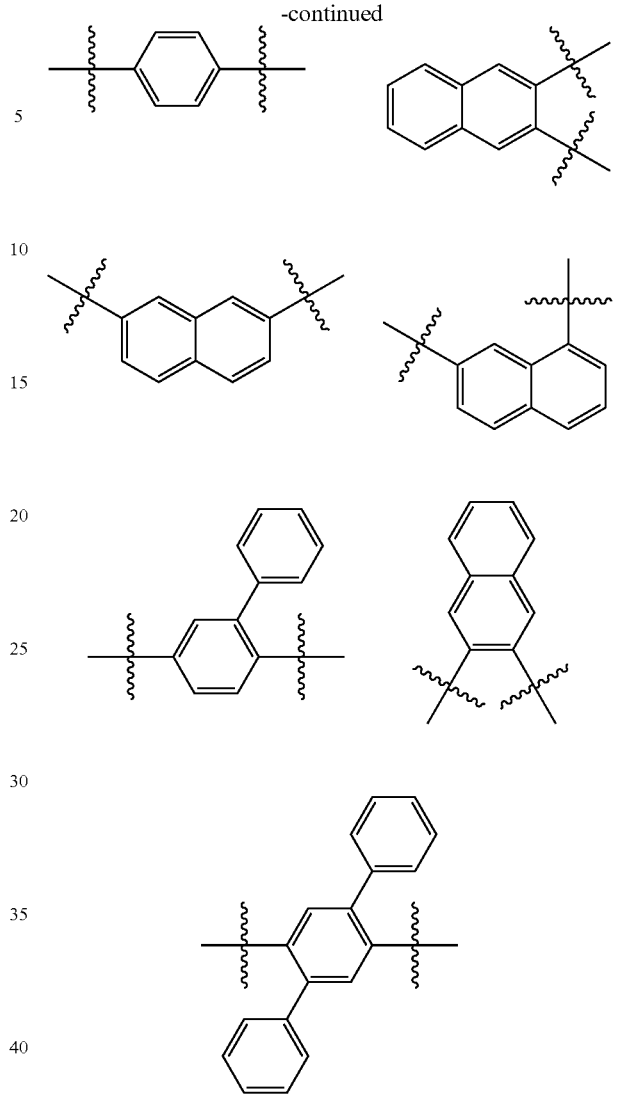

In the structural formulae, R and R' are each independently —NO$_2$ or —CF$_3$,

Q and Q' are each independently —SO$_3$H, —SO$_3^-$M$^+$, —COOH, —COO$^-$ M$^+$, —PO$_3$H$_2$, —PO$_3$H$^-$M$^+$, or —PO$_3^{2-}$2M$^+$, and M is a metal of Group 1.

According to an exemplary embodiment of the present specification, U$_1$, U$_2$, and U$_3$ are the same as or different from each other, and are each independently any one selected from the following structural formulae.

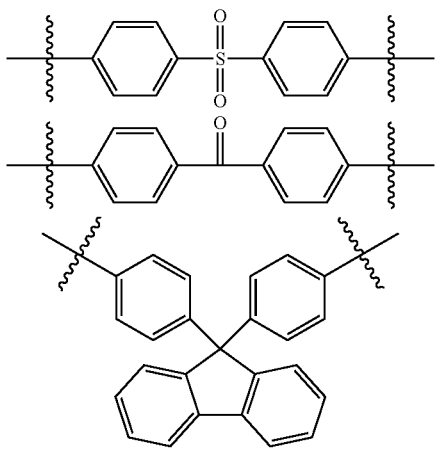

In the present specification,

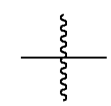

means being bonded to an adjacent substituent.

Examples of the substituents will be described below, but are not limited thereto.

Examples of the substituents will be described below, but are not limited thereto.

In the present specification, the alkyl group may be straight-chained or branch-chained, and the number of carbon atoms thereof is not particularly limited, but is preferably 1 to 50. Specific examples thereof include a methyl group, an ethyl group, a propyl group, an isopropyl group, a butyl group, a t-butyl group, a pentyl group, a hexyl group, a heptyl group, and the like, but are not limited thereto.

In the present specification, the alkenyl group may be straight-chained or branch-chained, and the number of carbon atoms thereof is not particularly limited, but is preferably 2 to 50. Specific examples thereof are preferably an alkenyl group in which an aryl group such as a stylbenyl group and a styrenyl group is substituted, but are not limited thereto.

In the present specification, the alkoxy group may be straight-chained or branch-chained, and the number of carbon atoms thereof is not particularly limited, but is preferably 1 to 50.

In the present specification, the cycloalkyl group is not particularly limited, but has preferably 3 to 60 carbon atoms, and particularly, a cyclopentyl group and a cyclohexyl group are preferred.

In the present specification, examples of the halogen group include fluorine, chlorine, bromine or iodine.

In the present specification, the number of carbon atoms of the amine group is not particularly limited, but is preferably 1 to 50. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a phenylnaphthylamine group, a ditolylamine group, a phenyltolylamine group, a triphenylamine group, and the like, but are not limited thereto.

In the present specification, the number of carbon atoms of the arylamine group is not particularly limited, but is preferably 6 to 50. Examples of the arylamine group mean a substituted or unsubstituted monocyclic diarylamine group, a substituted or unsubstituted polycyclic diarylamine group, or a substituted or unsubstituted monocyclic and polycyclic diarylamine group.

In the present specification, the aryl group may be monocyclic or polycyclic, and the number of carbon atoms thereof is not particularly limited, but is preferably 6 to 60. Specific examples of the aryl group include a monocyclic aromatic aryl group, such as a phenyl group, a biphenyl group, a triphenyl group, a terphenyl group, and a stilbene group, a polycyclic aromatic aryl group, such as a naphthyl group, a binaphthyl group, an anthracenyl group, a phenanthrenyl group, a pyrenyl group, a perylenyl group, a tetracenyl group, a chrysenyl group, a fluorenyl group, an acenaphthacenyl group, a triphenylenyl group, and a fluoranthene group, and the like, but are not limited thereto.

In the present specification, the heteroaryl group includes S, O, or N as a heteroatom, and the number of carbon atoms thereof is not particularly limited, but is preferably 2 to 60. Specific examples of the heteroaryl group include a pyridyl group, a pyrrolyl group, a pyrimidyl group, a pyridazinyl group, a furanyl group, a thienyl group, an imidazolyl group, a pyrazolyl group, an oxazolyl group, an isoxazolyl group, a thiazolyl group, an isothiazolyl group, a triazolyl group, a furazanyl group, an oxadiazolyl group, a thiadiazolyl group, a dithiazolyl group, a tetrazolyl group, a pyranyl group, a thiopyranyl group, a diazinyl group, an oxazinyl group, a thiazinyl group, a dioxynyl group, a triazinyl group, a tetrazinyl group, a quinolyl group, an isoquinolyl group, a quinazolinyl group, an isoquinazolinyl group, an acridinyl group, a phenanthridinyl group, an imidazopyridinyl group, a diazanaphthalenyl group, a triazaindene group, an indolyl group, a benzothiazolyl group, a benzoxazolyl group, a benzimidazolyl group, a benzothiophene group, a benzofuran group, a dibenzothiophene group, a dibenzofuran group, a carbazolyl group, a benzocarbazolyl group, a phenazinyl group, and the like, or fused rings thereof, but are not limited thereto.

In the present specification, the fluorenyl group may be substituted with another substituent, and substituents may combine with each other to form a ring. Examples thereof include

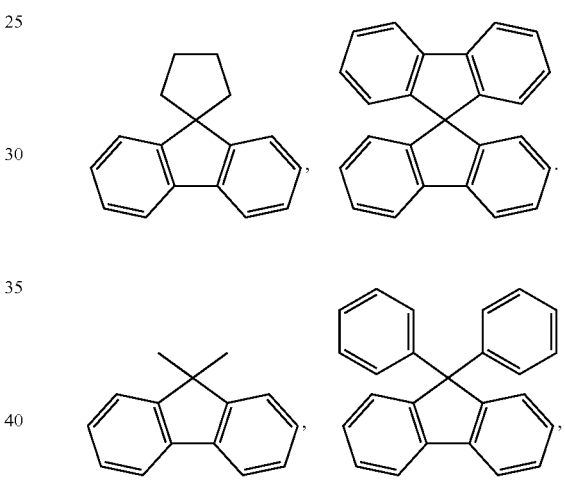

and the like.

Furthermore, in Chemical Formulae 2 to 7, the term "substituted or unsubstituted" means being substituted with one or more substituents selected from the group consisting of deuterium; a halogen group; an alkyl group; an alkenyl group; an alkoxy group; a cycloalkyl group; a silyl group; an arylalkenyl group; an aryl group; a boron group; an alkylamine group; an aralkylamine group; an arylamine group; a carbazole group; an arylamine group; an aryl group; a nitrile group; a nitro group; a hydroxy group; and a cyano group, or having no substituent.

According to an exemplary embodiment of the present specification, the element of Group 1 may be Li, Na, or K.

According to another exemplary embodiment, the polymer may have a weight average molecular weight of 500 or more and 5,000,000 or less (g/mol), specifically 10,000 or more and 2,000,000 or less (g/mol), and more specifically 50,000 or more and 1,000,000 or less (g/mol).

When the copolymer has a weight average molecular weight of 500 or more and 3,000,000 or less (g/mol), mechanical properties of an electrolyte membrane do not deteriorate, and an appropriate solubility of the polymer is maintained to easily prepare the electrolyte membrane.

In an exemplary embodiment of the present specification, the polymer may have a polydispersity index (PDI) of 1 or more and 6 or less (Mw/Mn), specifically, 1.5 or more and 4 or less (Mw/Mn).

An exemplary embodiment of the present specification provides a polymer electrolyte membrane including the polymer. The polymer electrolyte membrane may exhibit the above-described effects.

In the present specification, the "electrolyte membrane" is a membrane which may exchange ions, and includes a membrane, an ion exchange membrane, an ion transport membrane, an ion conductive membrane, a separation membrane, an ion exchange separation membrane, an ion transport separation membrane, an ion conductive separation membrane, an ion exchange electrolyte membrane, an ion transport electrolyte membrane, or an ion conductive electrolyte membrane, and the like.

The polymer electrolyte membrane according to the present specification may be prepared by materials and/or methods known in the art, except that the polymer electrolyte membrane includes the monomer derived from the compound for the brancher, which is represented by Chemical Formula 1.

According to an exemplary embodiment of the present specification, the polymer electrolyte membrane may have an ion conductivity of 0.01 S/cm or more and 0.5 S/cm or less, specifically 0.01 S/cm or more and 0.3 S/cm or less.

In an exemplary embodiment of the present specification, the ion conductivity of the polymer electrolyte membrane may be measured under humidified conditions. The humidified conditions in the present specification may mean a relative humidity (RH) of 10% to 100%.

According to an exemplary embodiment of the present specification, the electrolyte membrane may have a thickness of 1 μm to 200 μm, specifically, 10 μm to 100 μm. When the electrolyte membrane has a thickness of 1 μm to 200 μm, the electric short and the crossover of the electrolyte material may be reduced, and excellent positive ion conductivity characteristics may be exhibited.

An exemplary embodiment of the present specification provides a membrane electrode assembly including: a positive electrode; a negative electrode; and an electrolyte membrane provided between the positive electrode and the negative electrode, in which the electrolyte membrane is a polymer electrolyte membrane according to an exemplary embodiment of the present specification.

The membrane electrode assembly (MEA) means an assembly of electrodes (a positive electrode and a negative electrode) in which an electrochemical catalyst reaction of fuel and air occurs and a polymer membrane in which hydrogen ions are transported, and is a single integral-type unit in which electrodes (a positive electrode and a negative electrode) and an electrolyte membrane are adhered.

According to an exemplary embodiment of the present specification, the membrane electrode assembly is in the form in which a catalyst layer of a positive electrode and a catalyst layer of a negative electrode are brought into contact with an electrolyte membrane, and may be prepared by a typical method known in the art. As an example, the membrane electrode assembly may be prepared by thermally compressing, to 100 to 400, the positive electrode, the negative electrode, and the electrolyte membrane positioned between the positive electrode and the negative electrode in a state in which the positive electrode, the negative electrode, and the electrolyte membrane are brought into close contact with each other.

The positive electrode may include a positive electrode catalyst layer and a positive electrode gas diffusion layer. The positive electrode gas diffusion layer may include a positive electrode micro porous layer and a positive electrode substrate.

The negative electrode may include a negative electrode catalyst layer and a negative electrode gas diffusion layer. The negative electrode gas diffusion layer may include a negative electrode micro porous layer and a negative electrode substrate.

Further, an exemplary embodiment of the present specification provides a fuel cell including the membrane electrode assembly. Specifically, an exemplary embodiment of the present specification provides a polymer electrolyte-type fuel cell including: a stack which includes the two or more membrane electrode assemblies and a bipolar plate provided between the membrane electrode assemblies; a fuel supplying part which supplies fuel to the stack; and an oxidizing agent supplying part which supplies an oxidizing agent to the stack.

The positive electrode catalyst layer is a site where an oxidation reaction of fuel occurs, and it is possible to preferably use a catalyst selected from the group consisting of platinum, ruthenium, osmium, a platinum-ruthenium alloy, a platinum-osmium alloy, a platinum-palladium alloy, and a platinum-transition metal alloy.

The negative electrode catalyst layer is a site where a reduction reaction of an oxidizing agent occurs, and platinum or a platinum-transition metal alloy may be preferably used as a catalyst. The catalysts may be not only used as they are, but also used while being supported on a carbon-based carrier.

A process of introducing a catalyst layer may be carried out by a typical method known in the art, and for example, a catalyst layer may be formed by directly coating an electrolyte membrane with a catalyst ink or coating a gas diffusion layer with a catalyst ink. In this case, the method of coating a catalyst ink is not particularly limited, but it is possible to use a method such as spray coating, tape casting, screen printing, blade coating, die coating or spin coating, and the like. The catalyst ink may be representatively composed of a catalyst, a polymer ionomer, and a solvent.

The gas diffusion layer becomes a channel through which reaction gasses and water move along with a role as a current conductor, and has a porous structure. Accordingly, the gas diffusion layer may include a conductive substrate. As the conductive substrate, carbon paper, carbon cloth, or carbon felt may be preferably used.

In addition, the gas diffusion layer may further include a micro porous layer between the catalyst layer and the conductive substrate. The micro porous layer may be used in order to improve the performance of a fuel cell under low humidified conditions, and serves to allow an electrolyte membrane to be maintained in a sufficiently wet state by reducing the amount of water leaving out of the gas diffusion layer.

When the electrolyte membrane according to an exemplary embodiment of the present specification is used as an ion exchange membrane of a fuel cell, the above-described effect may be exhibited. An exemplary embodiment of the present specification provides a polymer electrolyte-type fuel cell including: two or more membrane electrode assemblies; a stack which includes a bipolar plate provided between the membrane electrode assemblies; a fuel supplying part which supplies fuel to the stack; and an oxidizing agent supplying part which supplies an oxidizing agent to the stack.

The fuel cell may be prepared by a typical method known in the art using the membrane electrode assembly according to an exemplary embodiment of the present specification. For example, the fuel cell may be prepared by being composed of the membrane electrode assembly prepared above and the bipolar plate.

FIG. 1 schematically illustrates the electricity generation principle of a fuel cell, and in the fuel cell, and the most fundamental unit of generating electricity is a membrane electrode assembly (MEA), and the membrane electrode assembly is composed of an electrolyte membrane 100 and electrodes of a positive electrode 200a and a negative electrode 200b formed on both surfaces of the electrolyte membrane 100. Referring to FIG. 1 which illustrates the elasticity generation principle of a fuel cell, an oxidation reaction of a fuel such as hydrogen or a hydrocarbon such as methanol and butane occurs in the positive electrode 200a, and as a result, hydrogen ions ($H^+$) and electrons ($e^-$) are generated, and the hydrogen ions move to the negative electrode 200b through the electrolyte membrane 100. In the negative electrode 200b, hydrogen ions transported through the electrolyte membrane 100, an oxidizing agent such as oxygen, and electrons are reacted to produce water. Electrons move to an external circuit by the reaction.

The fuel cell of the present specification includes a stack, a fuel supplying part, and an oxidizing agent supplying part.

FIG. 3 schematically illustrates the structure of a fuel cell, and the fuel cell includes a stack 60, an oxidizing agent supplying part 70, and a fuel supplying part 80.

The stack 60 includes the one or two or more membrane electrode assemblies, and when the two or more membrane electrode assemblies are included, the stack 60 includes a separator interposed therebetween. The separator serves to prevent the membrane electrode assemblies from being electrically connected to each other, and to transport fuel and an oxidizing agent supplied from the outside to the membrane electrode assemblies.

The oxidizing agent supplying part 70 serves to supply an oxidizing agent to the stack 60. As the oxidizing agent, oxygen is representatively used, and oxygen or the air may be used by being injected using a pump 70.

The fuel supplying part 80 serves to supply fuel to the stack 60, and may be composed of a fuel tank 81 which stores fuel and a pump 82 which supplies fuel in the fuel tank 81 to the stack 60. As the fuel, hydrogen or a hydrocarbon fuel in a gas or liquid state may be used. Examples of the hydrocarbon fuel include methanol, ethanol, propanol, butanol, or natural gases.

The fuel cell can be a polymer electrolyte fuel cell, a direct liquid fuel cell, a direct methanol fuel cell, a direct formic acid fuel cell, a direct ethanol fuel cell, or a direct dimethyl ether fuel cell, and the like.

An exemplary embodiment of the present specification provides a redox flow battery including the polymer electrolyte membrane. Specifically, an exemplary embodiment of the present specification provides a redox flow battery including: a cell including a positive electrode and a positive electrode electrolytic solution; a negative electrode cell including a negative electrode and a negative electrode electrolytic solution; and the polymer electrolyte membrane according to an exemplary embodiment of the present specification, which is provided between the positive electrode cell and the negative electrode cell.

When the electrolyte membrane according to an exemplary embodiment of the present specification is used as an ion exchange membrane of a redox flow battery, the above-described effect may be exhibited.

The redox flow battery may be prepared by a typical method known in the art, except that the redox flow battery includes the polymer electrolyte membrane according to an exemplary embodiment of the present specification.

As illustrated in FIG. 2, the redox flow battery is divided into a positive electrode cell 32 and a negative electrode cell 33 by an electrolyte membrane 31. The positive electrode cell 32 and the negative electrode cell 33 include a positive electrode and a negative electrode, respectively. The positive electrode cell 32 is connected to a positive electrode tank 10 for supplying and releasing a positive electrode electrolytic solution 41 through pipes. The negative electrode cell 33 is also connected to a negative electrode tank 20 for supplying and releasing a negative electrode electrolytic solution 42 through pipes. The electrolytic solution is circulated through pumps 11 and 21, and an oxidation/reduction reaction (that is, a redox reaction) in which the oxidation number of ions is changed occurs, and as a result, the charge and discharge occur in the positive electrode and the negative electrode.

MODE FOR INVENTION

Hereinafter, the present specification will be described in more detail through Examples. However, the following Examples are provided for exemplifying the present specification, and the scope of the present specification is not limited thereby.

Polymer Synthesis Example 1

1) Synthesis of Polymer 1-A

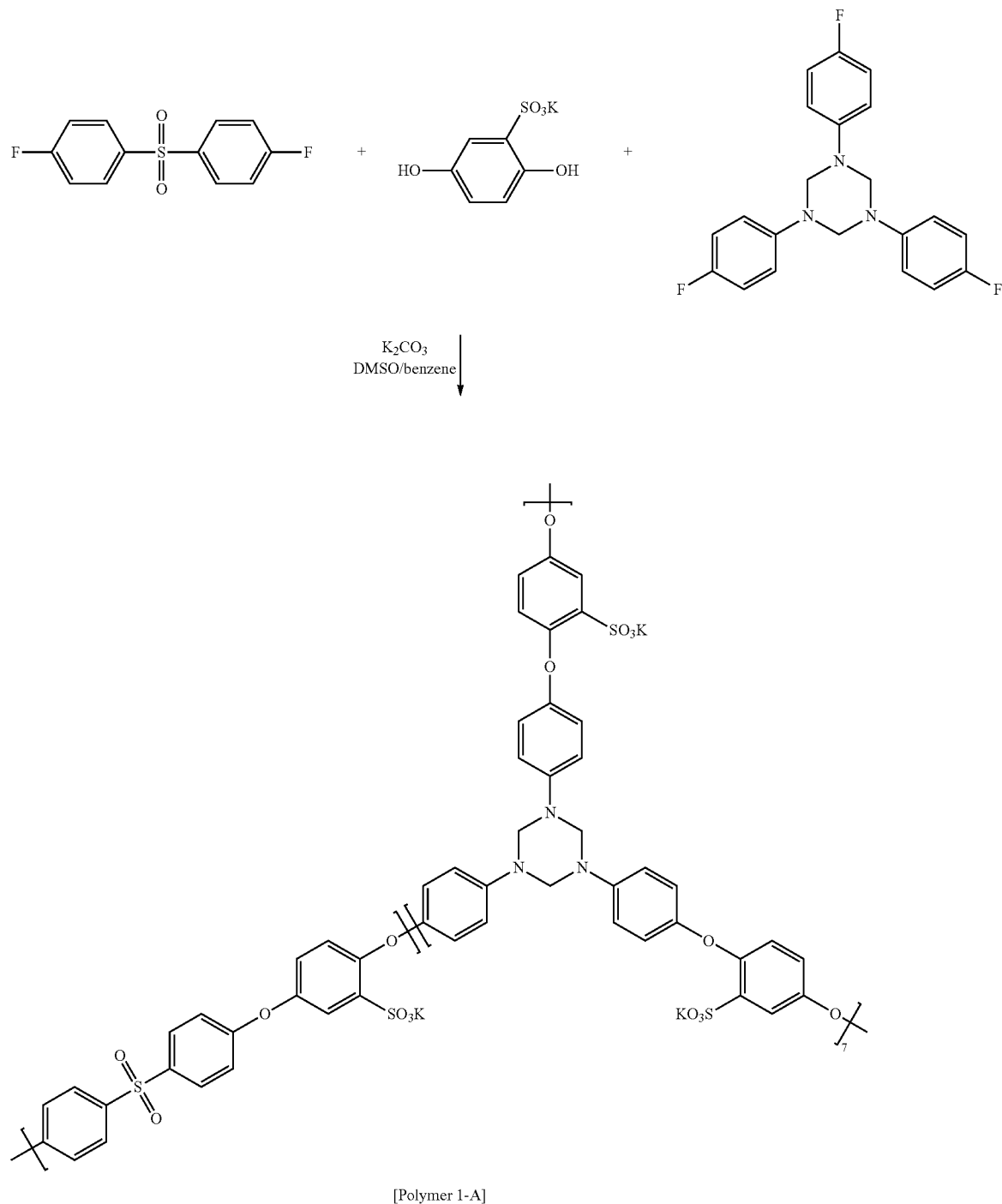

[Polymer 1-A]

A mixture was prepared by putting 11.35 g (0.1040 ml) of bis(4-fluorophenyl)methanone, 12.5 g (0.1095 mol) of potassium 2,5-dihydroxybenzenesulfonate, 13.6 g (0.1971 g) of $K_2CO_3$, 0.9328 g of 1,3,5-tris(4-fluorophenyl)-1,3,5-triazinane, and 119.25 g of dimethyl sulfoxide (DMSO) into a 500-ml double jacket, and then the mixture was heated under a nitrogen atmosphere at 140° C. for 5 hours, and then an azeotrope adsorbed on molecular sieves of a Dean-Stark apparatus was completely removed while back-flowing benzene with pressurized nitrogen, and then polymerization was performed at 180° C. for 20 hours to obtain Polymer 1-A.

2) Synthesis of Copolymer 1
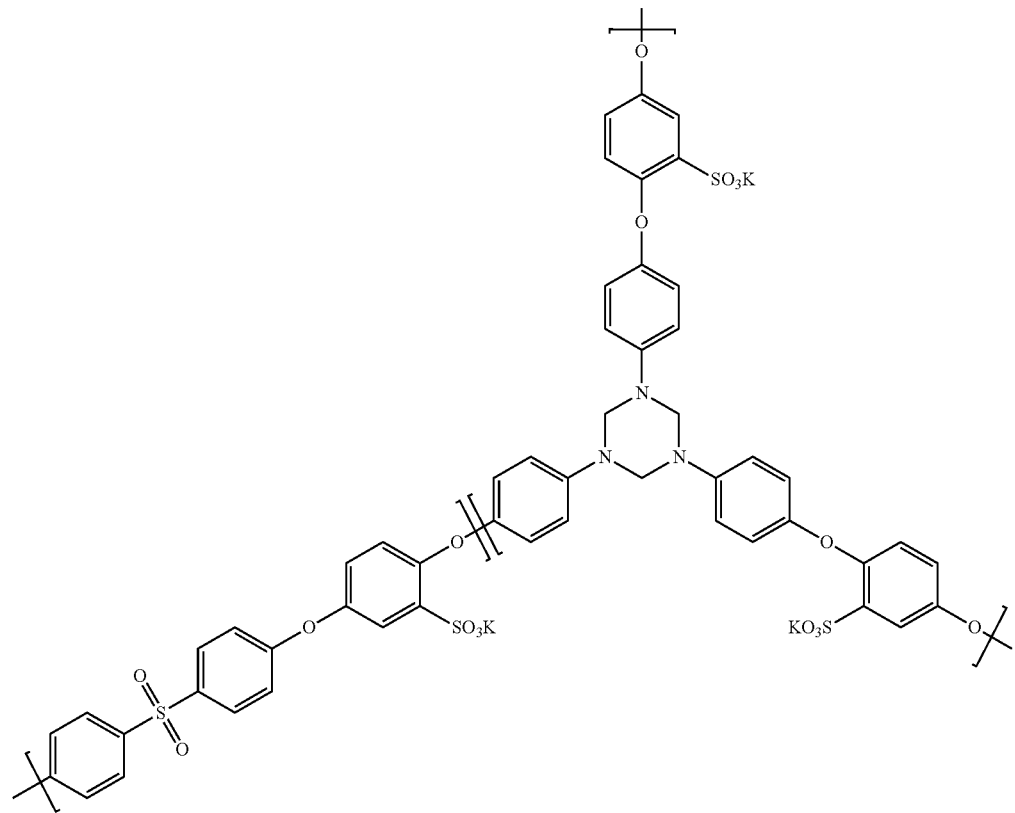
[Polymer 1-A]
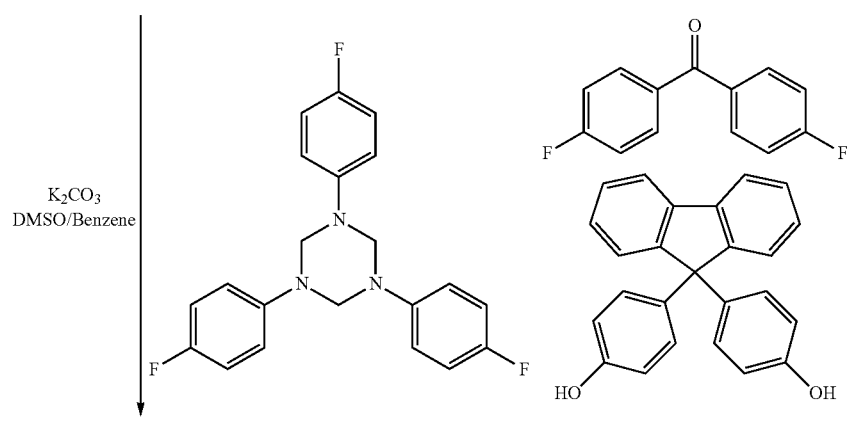

-continued
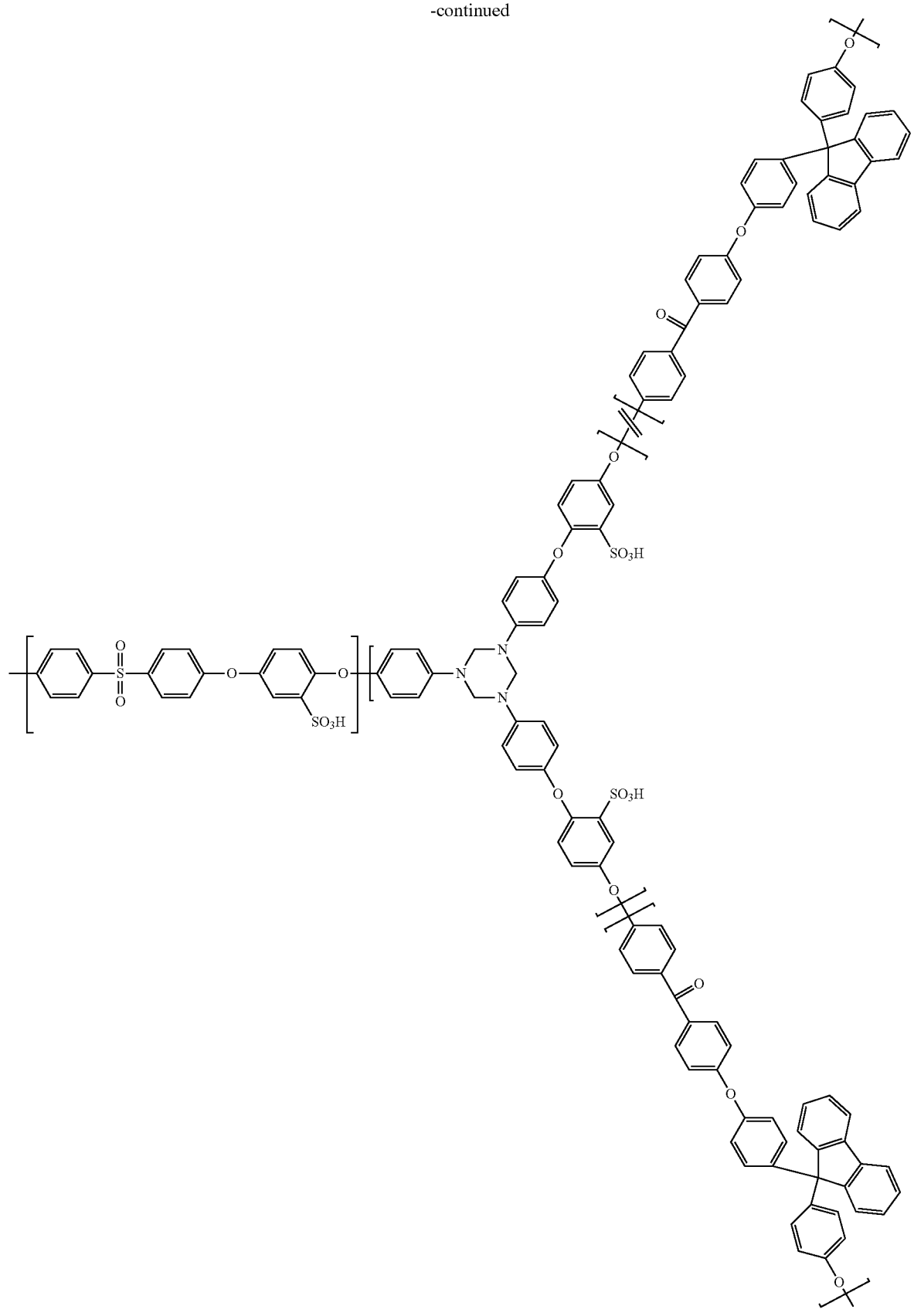
[Polymer 1]

The mixture including Polymer 1-A was cooled to room temperature, and then 1.691 g (0.1877 mol) of bis(4-fluorophenyl)methanone, 0.9328 g (0.0069 ml) of 1,3,5-tris(4-fluorophenyl)-1,3,5-triazinane, 19.4 g (0.2816 mol) of $K_2CO_3$, 34.53 g of dimethyl sulfoxide (DMSO), and 34.53 g of benzene were added thereto to prepare a mixture, and then the mixture was heated under a nitrogen atmosphere at 140° C. for 5 hours, an azeotrope adsorbed on molecular sieves of a Dean-Stark apparatus was completely removed while back-flowing benzene with pressurized nitrogen, and then the benzene of the Dean-Stark was refluxed and then released, and polymerization was carried out in dimethyl sulfoxide (DMSO) at 180° C. for 20 hours.

Subsequently, the temperature was cooled to room temperature, and then a polymerized polymer was precipitated in 3 L of isopropyl alcohol to form a precipitate, and then a solvent of the precipitate was removed, the precipitate was washed by using deionized water at room temperature for 48 hours to remove the remaining $K_2CO_3$, and then the residue was dried in a vacuum oven at 90° C. for 48 hours to obtain a polymer (Polymer 1) into which a partial fluorine-based brancher including Polymer 1-A was introduced.

Comparative Synthesis Example 1

The synthesis was carried out in the same manner as in Polymer Synthesis Example 1, except that the following Compound Z instead of 1,3,5-tris(4-fluorophenyl)1,3,5-triazinane was used as a brancher.

[Compound Z]

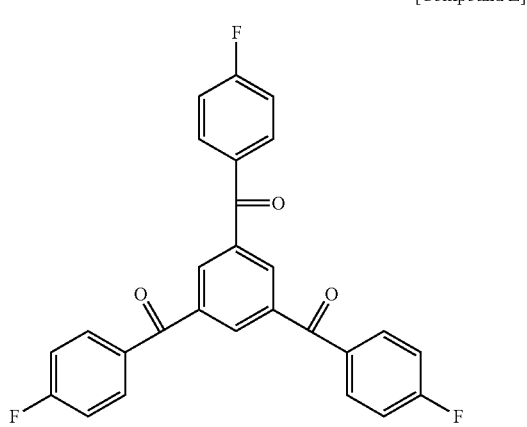

The weight average molecular weight of the polymer polymerized in Polymer Synthesis Example 1 was 458,000 g/mol, and the polymer using the monomer derived from the compound of Chemical Formula 1 exhibited a more improved weight average molecular weight than a polymer (weight average molecular weight 77,000 g/mol) polymerized without using a brancher.

In addition, the weight average molecular weight of the polymer using the following Compound Z as a brancher was 367,000 g/mol, and was lower than that of the polymer using the monomer derived from the compound of Chemical Formula 1.

Experimental Example (Fenton's Test)

First, the weight of a film-formed polymer electrolyte membrane was measured. A polymer electrolyte membrane film-formed by using the polymer (Polymer 1) synthesized in Polymer Synthesis Example 1 was put into a 3% $H_2O_2$ solution including a small amount of $Fe^{2+}$ ions, and the resulting mixture was stirred at 80° C. for 20 hours. After the test was carried out, the decomposition rate (%) was obtained by measuring the weight of the polymer electrolyte membrane from which moisture was completely removed to obtain a value of difference between the weights before and after the test.

Comparative Experimental Example

The experiment was carried out in the same manner as in the Experimental Example, except that a polymer electrolyte membrane using Compound Z instead of Polymer 1 as a brancher was used.

TABLE 1

| Type of electrolyte membrane | Composition of Fenton reagent | Temperature (° C.) | Weight average molecular weight [g/mol] | Amount of ions exchanged (meq/g) | Decomposition rate (%) |
|---|---|---|---|---|---|
| Experimental Example | 3% $H_2O_2$/4 ppm $Fe^{2+}$ solution | 80 | 458,000 | 1.84 | 3% |
| Comparative Experimental Example | | | 367,000 | 1.82 | 10% |

The polymer electrolyte membrane film-formed by using the polymer of the present invention had a larger ion exchange capacity value and a lower decomposition rate for the Fenton reagent than those of the polymer electrolyte membrane of the Comparative Experimental Example using a brancher in the related art.

EXPLANATION OF REFERENCE NUMERALS AND SYMBOLS

100: Electrolyte membrane
200a: Anode
200b: Cathode
10, 20: Tank
11, 21: Pump
31: Electrolyte membrane
32: Positive electrode cell
33: Negative electrode cell
41: Positive electrode electrolytic solution
42: Negative electrode electrolytic solution
60: Stack
70: Oxidizing agent supplying part
80: Fuel supplying part
81: Fuel tank
82: Pump

The invention claimed is:

1. A polymerization composition for a polymer comprising a compound for a brancher, which is represented by the following Chemical Formula 1,
wherein the polymer comprises a unit, which is represented by Chemical Formula 8:

[Chemical Formula 1]

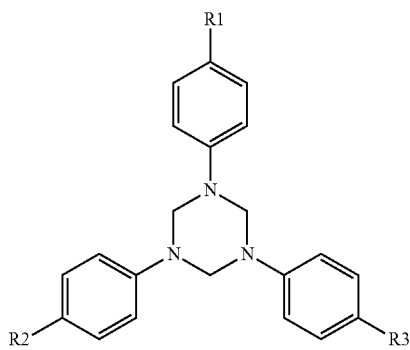

[Chemical Formula 8]

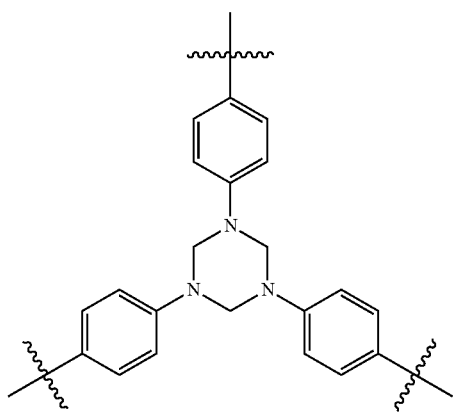 [SMILES: *c1ccc(N2CN(c3ccc(*)cc3)CN(c3ccc(*)cc3)C2)cc1]

in Chemical Formula 1,

R1 to R3 are the same as or different from each other, and are each a halogen group or a hydroxy group, wherein at least one of R1 to R3 is fluorine or chlorine.

2. The polymerization composition of claim 1, wherein R1 to R3 are the same as each other.

3. The polymerization composition of claim 1, wherein the compound for the brancher, which is represented by Chemical Formula 1, is any one selected from the following structures:

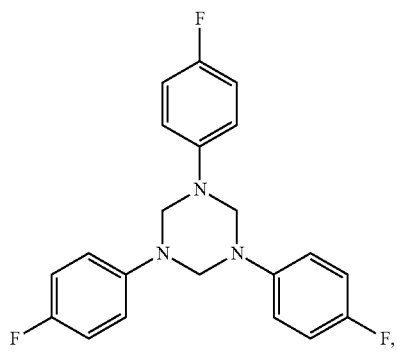

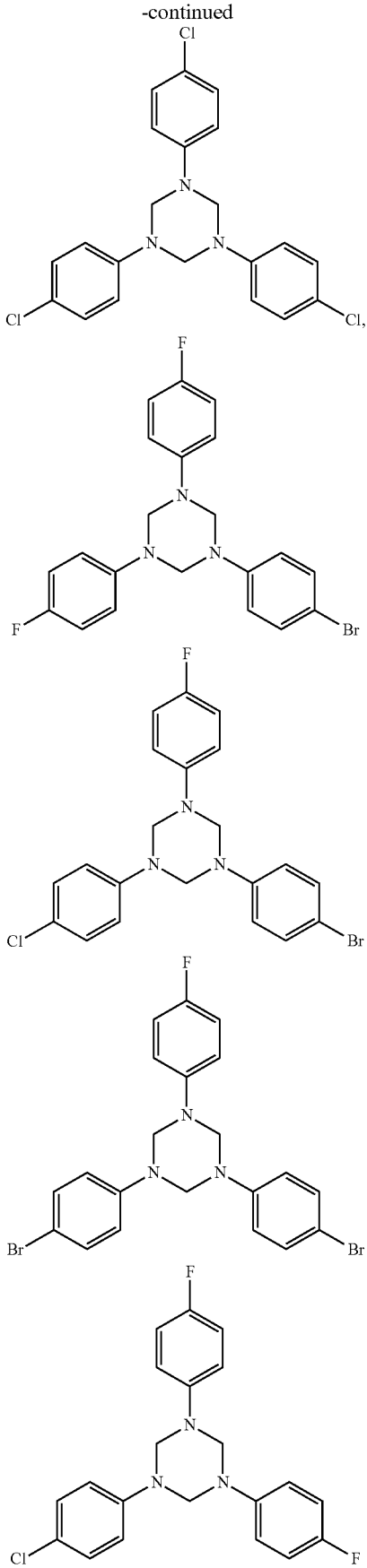

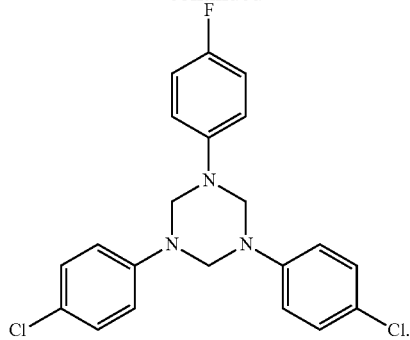
* * * * *